(12) United States Patent
Shaw et al.

(10) Patent No.: US 8,752,346 B1
(45) Date of Patent: Jun. 17, 2014

(54) ROTABLE HEAT TRANSFER TUBING RETENTION PANELS

(75) Inventors: Todd Shaw, Mount Sinai, NY (US); Frank Bilotta, Mount Sinai, NY (US)

(73) Assignee: Warm Brothers, Inc.

( * ) Notice: Subject to any disclaimer, the term of this patent is extended or adjusted under 35 U.S.C. 154(b) by 860 days.

(21) Appl. No.: 11/528,171

(22) Filed: Sep. 27, 2006

(51) Int. Cl.
 *F24D 3/12* (2006.01)
(52) U.S. Cl.
 USPC ............. 52/220.2; 52/220.3; 165/56; 237/69
(58) Field of Classification Search
 CPC ............. E04B 5/48; F24D 3/14; F24D 3/141; F25F 2210/10
 USPC ............. 52/220.1, 220.2, 220.3; 237/69, 43; 165/56, 49; 428/156, 167, 60, 172; 144/344, 347, 354
 See application file for complete search history.

(56) References Cited

U.S. PATENT DOCUMENTS

| | | | |
|---|---|---|---|
| 3,037,746 A | 6/1962 | Williams | |
| 3,366,170 A | 1/1968 | Welz | |
| 4,326,366 A * | 4/1982 | Werner | 52/220.3 |
| 4,508,162 A * | 4/1985 | Radtke | 165/56 |
| 4,576,221 A | 3/1986 | Fennesz | |
| 4,779,673 A | 10/1988 | Chiles et al. | |
| 4,865,120 A | 9/1989 | Shiroki | |
| 4,911,353 A | 3/1990 | Deakin | |
| 5,078,203 A | 1/1992 | Shiroki | |
| 5,454,428 A | 10/1995 | Pickard et al. | |
| 5,497,826 A | 3/1996 | Ingram | |
| 5,579,996 A | 12/1996 | Fiedrich | |
| 5,740,858 A | 4/1998 | Ingram | |
| 5,743,330 A | 4/1998 | Bilotta et al. | |
| 5,788,152 A | 8/1998 | Alsberg | |
| 5,799,723 A | 9/1998 | Sokolean | |
| 5,931,381 A | 8/1999 | Fiedrich | |
| 6,092,587 A | 7/2000 | Ingram | |
| 6,251,495 B1 | 6/2001 | Wilson et al. | |
| 6,283,382 B1 | 9/2001 | Fitzemeyer | |
| 6,533,185 B1 | 3/2003 | Muir | |
| 6,621,983 B2 * | 9/2003 | Thorin | 392/435 |
| 6,800,352 B1 | 10/2004 | Hejna et al. | |
| 7,021,372 B2 | 4/2006 | Pickard | |

FOREIGN PATENT DOCUMENTS

| | | | |
|---|---|---|---|
| DE | 3208278 A1 | * | 9/1983 |
| DE | 202005009253 | * | 11/2005 |
| JP | 08128657 A | * | 5/1996 |
| JP | 09222231 A | * | 8/1997 |
| JP | 10219925 A | * | 8/1998 |
| JP | 2000-074402 A | * | 3/2000 |
| JP | 2000-291247 A | * | 10/2000 |
| JP | 2003-314835 | * | 11/2003 |
| JP | 2004-143927 A | * | 5/2004 |
| WO | WO 95/17567 | * | 6/1995 |
| WO | 00/32991 | | 8/2000 |

\* cited by examiner

*Primary Examiner* — Brian Glessner
*Assistant Examiner* — Jessie Fonseca

(57) ABSTRACT

A panel having a surface for supporting heat transfer tubing and at least one edge for mating and interlocking with an adjacent panel, improves versatility in leading the tubing upon the supporting surface in a variety of configurations.

6 Claims, 6 Drawing Sheets

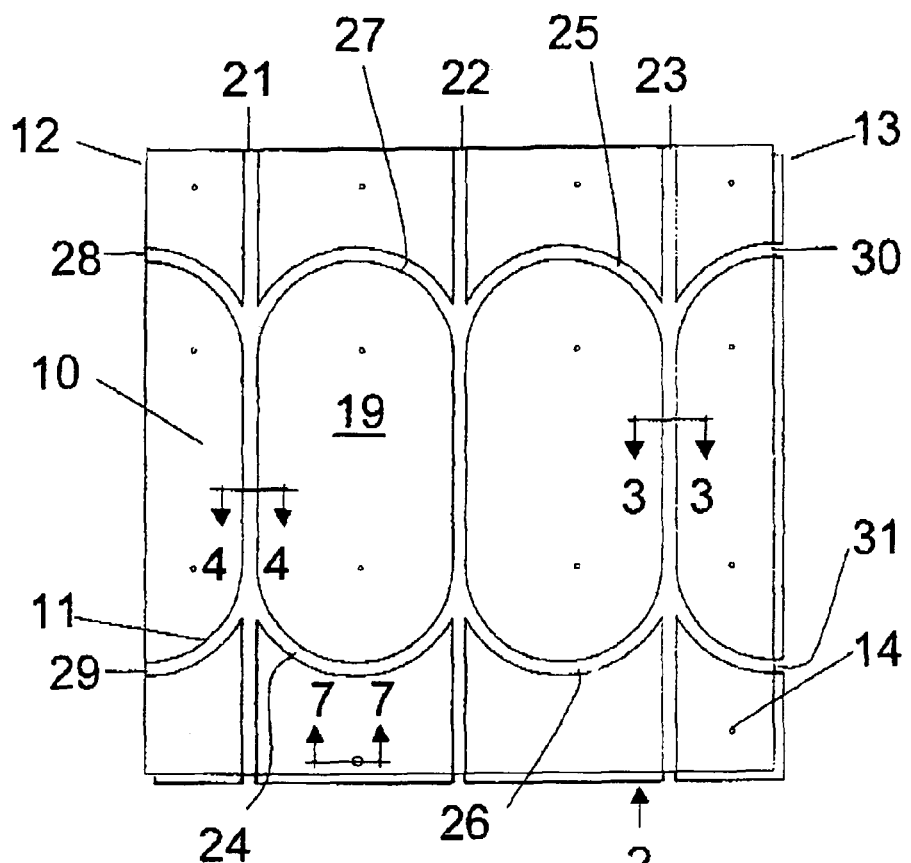
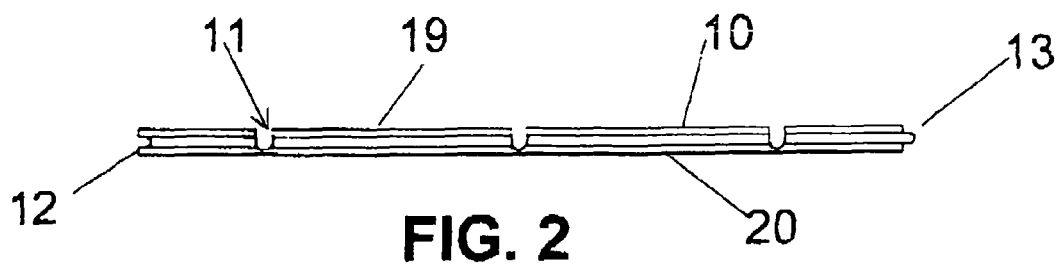

ROTABLE HEAT TRANSFER TUBING RETENTION PANELS

BACKGROUND OF THE INVENTION

The present invention is directed to a panel for supporting tubing carrying fluid, e.g., radiant heat transfer medium. More particularly, the present invention is directed to such a panel capable of securely supporting the tubing in any of a variety of configurations thereon in a stable, versatile manner and easily installed into building structures from any available position. As used herein, the term "heat transfer" encompasses heat exchange for both heating and cooling purposes. For example, the heat transfer tubing can carry heating fluid such as water or cooling/refrigeration fluid such as Freon ($CCl_3F$).

Numerous types of structures for retaining heat transfer tubing on floors, walls, ceilings, etc. are disclosed, e.g., in U.S. Pat. Nos. 6,533,185; 5,579,996; and 6,283,382. These types of prior art structures suffer from the disadvantages of requiring a multiple of differently shaped or configured panels to support and retain the tubing in a desired pattern, and/or absence of secure interlocking between adjacent panels to provide secure and smooth direction of the tubing, and/or insufficient directing of radiant heat flow in a desired direction.

U.S. Pat. Nos. 6,800,352; 6,251,495 disclose utilizing a radiant heat barrier to reduce unwanted heat transmission in a particular direction, but are still deficient in securely supporting the tubing in any number of patterns. U.S. Pat. Nos. 6,092,587; 5,740,858 and 5,497,826 show heating/cooling systems having panels with very specific arrangement of both supporting channels for heat transfer tubing and heat barrier layer, hence lacking in versatility.

SUMMARY OF THE INVENTION

Accordingly, it is an object of the invention to improve heat transfer such as heating or cooling.

It is also an object of the present invention to improve installing and support of heat transfer tubing within a structure in a versatile manner to enhance ease of installing and options for laying the tubing in any number of different patterns.

These and other objects are attained by the present invention which is directed to a panel for supporting tubing and having two surfaces, one surface arranged to receive and support the tubing and at least one edge arranged to interlock and mate with an adjacent panel to provide a continuous channel between the two panels for supporting the tubing. Preferably, the panel which is substantially rectangular (e.g., square) comprises male-female members along the edges, e.g., tongue and grooves, for mating with one another upon interlocking.

The channel for supporting the tubing is constituted by a grooved pathway snaking around the supporting surface in a variety of configurations, e.g. three substantially parallel channels extending edge-to-edge, two oblong-shaped portions, each positioned between two of the three substantially parallel channels, and two partial oblong-shaped portions positioned between one of the substantially parallel channels and an edge of the panel. Additionally, openings are provided through the panels at discrete locations for receiving fastening means and/or aligning the panel(s) upon an outer structure.

The present invention provides for complete freedom of installation layout by providing for any required change in direction of the snaked tubing. Prior art panels required a multiple of different panels with specific grooves, channels or pathways each providing only one choice of direction for laying the heat transfer tubing. Furthermore, the present invention provides for secure interlocking of adjacent panels, eliminating the problem of non-uniform surface of installed panels encountered in the prior art and the resulting installation difficulties or defects of a finish covering installed over the panels. At the same time, unwanted irradiation of heat is minimized, especially by incorporating a heat barrier layer on a side of the panels opposite the channels for the tubing.

BRIEF DESCRIPTION OF THE DRAWINGS

The present invention will be described in greater detail with reference to the accompanying drawings, in which FIG. 1 illustrates a top plan view of one embodiment of the supporting panel in accordance with the present invention;

FIG. 2 illustrates a front elevational view of the panel in the direction of arrow 2 in FIG. 1;

DESCRIPTION OF THE PREFERRED EMBODIMENTS

Figure 3:
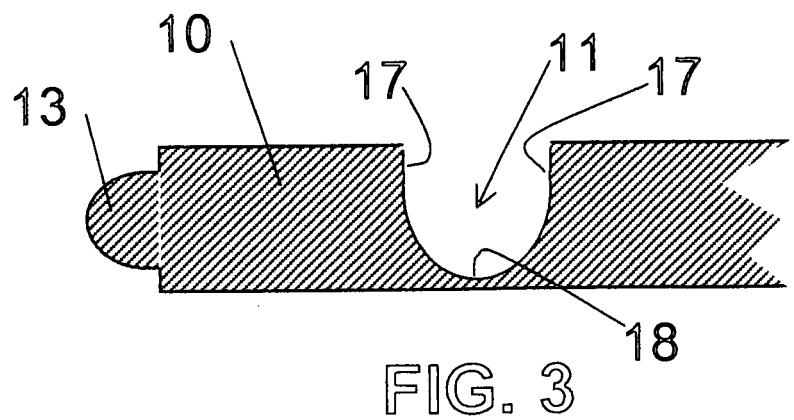
FIG. 3 illustrates a sectional view of the panel in the direction of arrows 3-3 in FIG. 1.

Referring to the drawings, a panel 10 for supporting tubing 15, such as heat transfer tubing, is shown in plan view. The panel 10 comprises two opposing surfaces 19, 20, with one of the surfaces 19 supporting the tubing 15 and is approximately rectangular in shape when viewed from the direction of one of these two opposing surfaces 19, 20. Four edges of the panel meet at approximately 90° angles with respect to one another and comprise means for interlocking with adjacent panels 10 when coupled together.

More particularly, as shown in FIG. 1, two of the four edges comprises projecting male members, e.g., tongues 13 and two of the four edges comprises receiving female members, e.g., grooves 12. The edges comprises the tongues 13 are arranged to meet at a corner of the panel 10 while the edges comprising the grooves 12 are arranged to meet at an opposite corner of the panel 10, as shown in FIG. 1. Alternatively, the edges comprising the respective tongues 13 and grooves 12 can be alternatingly arranged around the perimeter of the panel 10 so that edges comprising the tongues 13 are positioned on opposite sides of the panel 10 from one another and edges comprising the grooves 12 are positioned on opposite sides of the panel 10 from one another.

Figure 4:
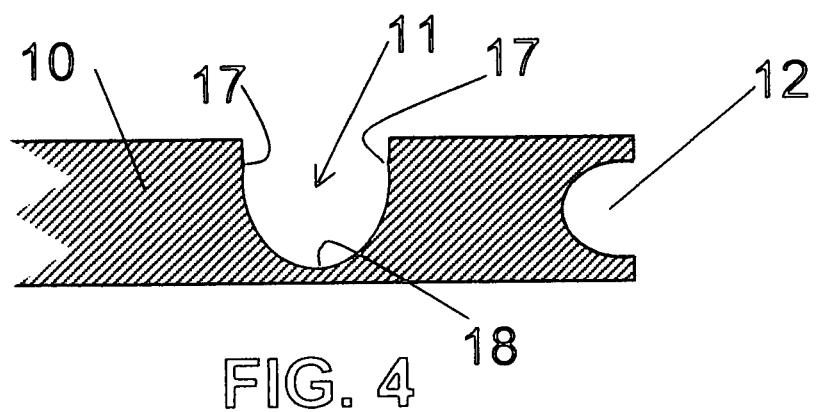
FIG. 4 illustrates a sectional view of the panel in the direction of arrows 4-4 in FIG. 1.
Figure 6:
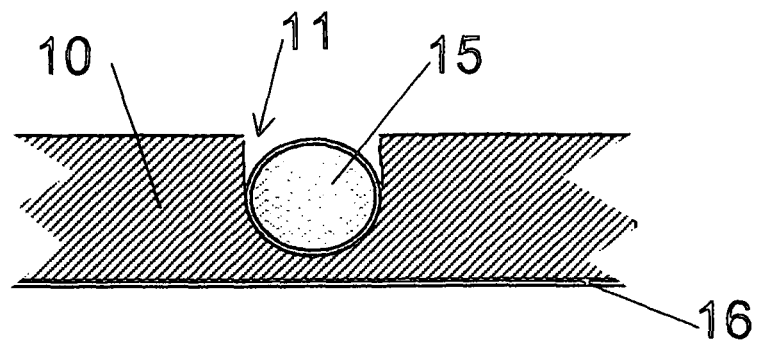
FIG. 6 schematically illustrates a sectional view of the panel showing positioning of tubing supported thereby and an additional underlying layer of heat reflective material.
Figure 7:
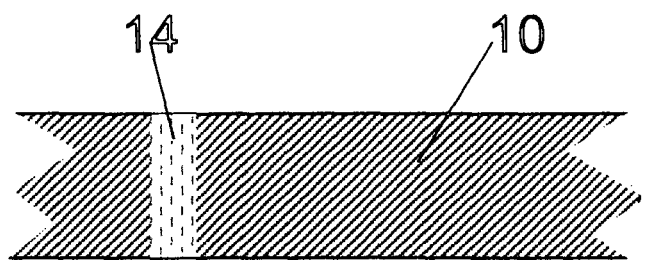
FIG. 7 illustrates a sectional view in the direction of arrows 7-7 in FIG. 1.
Figure 8:
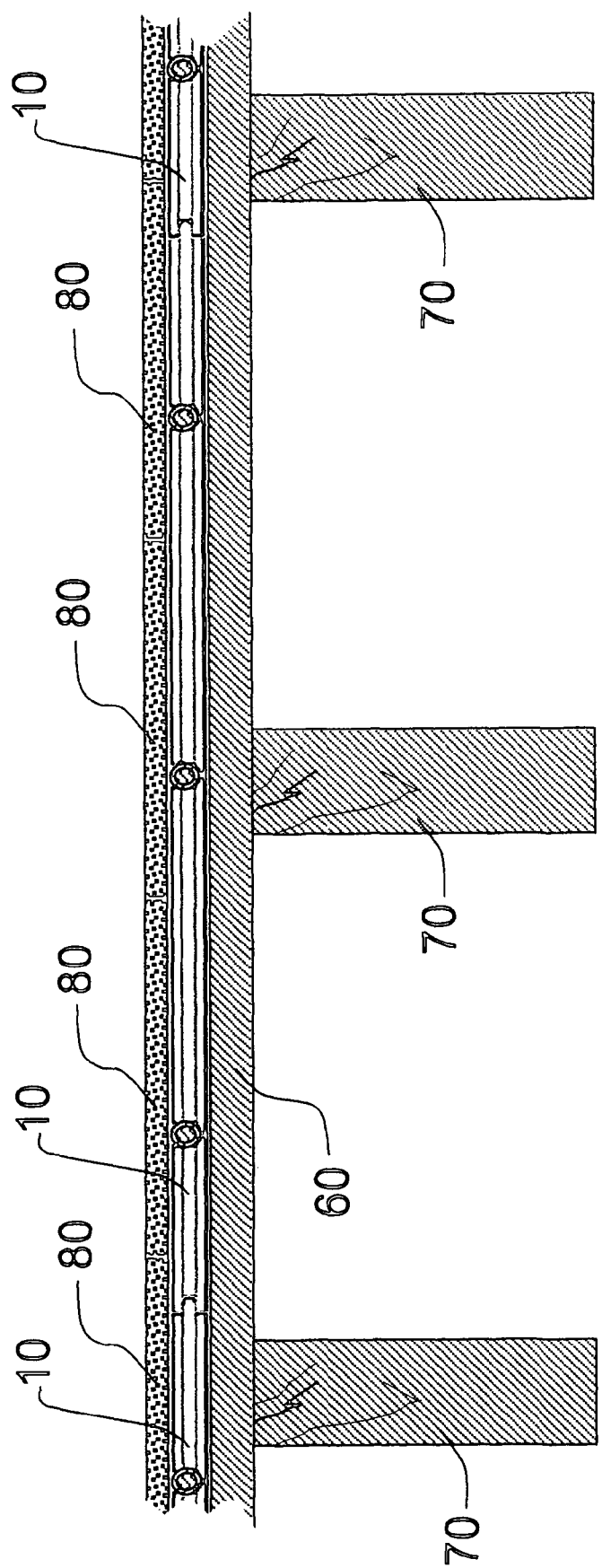
FIG. 8 illustrates an elevational view showing mounting of the panel of FIG. 1 above a sub-floor in a building installation.

The surface 19 supporting the tubing 15 comprises a grooved pathway 11 for receiving and retaining the tubing positioned therein, as illustrated, e.g., in FIGS. 6 and 8. As best seen in FIGS. 3 and 4, this grooved pathway 11 possesses a cross-section substantially in the shape of a U having substantially parallel sides 17, 17 and a base 18 with a radius of curvature about 0.210 to about 0.370 inches, preferably about 0.25 inches, and/or an arc of about 180 degrees. This pathway 11 securely retains tubing 15 seated therewithin and having a radius substantially the same as the radius of curvature of the base 18 of the U. The tubing 15 can contain heat transfer fluid flowing therethrough as shown in FIG. 6, although this tubing 15 is not limited to transporting a particular type of fluid within the purview of the present invention.

Figure 9:
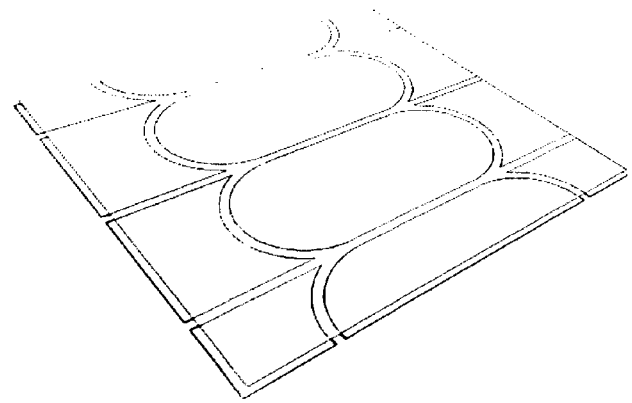
FIG. 9 illustrates a perspective view of panel shown FIG. 1.
Figure 9A:
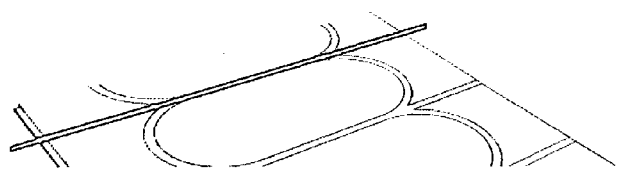
FIG. 9A schematically illustrates a partial perspective view of FIG. 9 showing one way of positioning tubing upon the supporting panel.
Figure 9B:
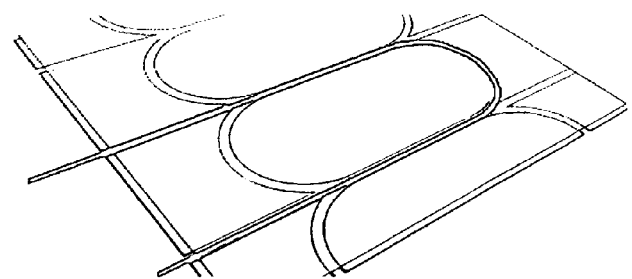
FIG. 9B schematically illustrates a partial perspective view of FIG. 9 showing an alternative way of mounting the tubing.
Figure 9C:
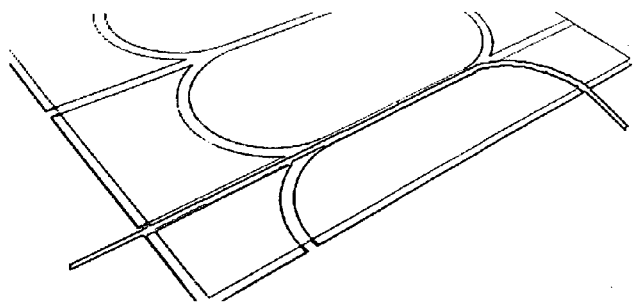
FIG. 9C schematically illustrates a partial perspective view of FIG. 9 showing a further alternative way of mounting the tubing.

The grooved pathway 11 extends around and over this surface 19 of the panel 10 in a variety of permutations, as best seen in FIGS. 1 and 9-9C. This allows tubing 15 to be laid upon the supporting surface 19 of the panel 10 in a variety of configurations. For example, as shown in FIG. 9A, tubing 15 can be positioned in grooved pathway 11 to extend across panel 10 at opposite edges. Alternatively, as shown in FIG. 9B, tubing 15 can be positioned in grooved pathway 11 to enter and exit from the same edge of the panel 10. Furthermore, as shown in FIG. 9C, tubing 15 can be positioned in grooved pathway 11 to enter and exit from adjacent normal edges of panel 10.

Thus, the illustrated configuration of grooved pathway 11 allows heat transfer tubing 15 to be versatilely mounted upon supporting panel 10 in a variety of shapes and directions, and also enter and exit from adjacent panels 10 possessing the same configuration of grooved pathway 11 in a variety of shapes and directions. The illustrated configuration of grooved pathway 11 upon the surface of panel 10 has three substantially parallel channels 21, 22, 23 extending entirely across the panel surface 19 between opposite edges. Two oblong-shaped groove portions are situated entirely upon the panel surface 19 and dovetail with the substantially parallel channels 21, 22, 23 as shown, such that said substantially-parallel channels 21, 22, 23 form straight edges of said oblong-shaped portion and a center substantially-parallel channel 22 forms a straight edge of two oblong-grooved portions. Alternatively, the panel 10 in accordance with the present invention may comprise only one oblong-shaped groove situated entirely upon the panel surface 19 between the edges.

Each oblong-shaped groove comprises curved portions 24, 25, 26, 27 situated opposite one another and mating or dovetailing with the substantially parallel grooves 21, 22, 23. Additionally, as shown in FIGS. 1 and 9-9C, partially oblong-shaped grooves may be situated at opposite edges of the panel 10 such that the curved portion 28, 29, 30, 31 of each partial oblong-shaped groove extends to the same edge of the panel 10. The curved portions 24-31 of the grooved pathway 11 each have a radius of curvature of approximately 3 to about 6 inches, preferably about 4 inches, and/or an arc of curvature of approximately 180 degrees (90 degrees for partial curved portions 28-31).

Figure 5:
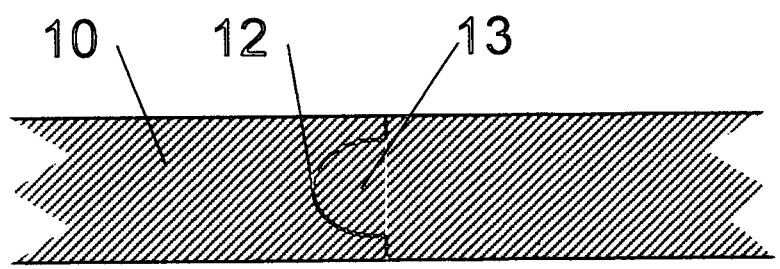
FIG. 5 schematically illustrates a sectional view showing coupling of adjacent panels to one another.

As shown in FIG. 5, the tongue 13 and groove 12 of adjacent panels 1 conveniently mate with one another to form continuous channels of grooved pathway 11, enhancing ease of mounting tubing 15 therewithin. The configuration of the grooved pathway 11, notably the partial oblong sections, means the open ends of either the substantially parallel channels 24-27 or the curved channels 28-31 of the partial oblong sections at the respective edges, mate with the respective open ends of the channels of the adjacent panels 10 upon interlocking, thus allowing the tubing 15 to be snaked in the respective pathway channels in a variety of directions or configurations as illustrated, e.g., in FIGS. 9A-9C.

Additionally, a series of openings or perforations 14 are drilled entirely through the panel 10 at regular discrete intervals, to provide pathways for fastening devices such as nails, screws and dowels to securely adhere the supporting panel 10 to structural surface underneath. The perforations 14 all aid in aligning the various panels 10 on top of the structural surface. In the illustrated embodiment, the panel 10 comprises sixteen such perforations 14 extending therethrough, although the precise number of such perforations 14 can vary within the context of the present invention.

Furthermore, the bottom surface 20 of the supporting panel 10 (i.e., the surface opposite the surface 19 comprising the grooved pathway 11) may be provided with a layer 16 heat reflective material, e.g., aluminum. The panels 10 themselves, may be composed of plywood, fiberboard or chipboard. The layer 16 of heat reflective material forms a radiant heat barrier limiting unwanted heat dissipation through the panels 10 to the surroundings as heat transfer medium flows through the tubing 15. Aluminum is highly reflective, preventing up to 97% of radiant heat from radiating into surrounding area. Furthermore, aluminum itself possesses low emissivity, and therefore does not readily emit heat to surroundings. The panels 10 themselves are designed as supporting structure for heat conduit and not for radiant heat transfer to surroundings.

Installation of the panels 10 together with the heat transfer tubing 15 within various structures is illustrated in FIG. 8. The panels 10 are individually-positioned and coupled together upon sub-floor 60 between joints 70. Then, the panels 10 are fastened to the sub-floor 60 by hammering appropriate fasteners such as nails into place through the perforations 14. Once the panels 10 have been appropriately secured to the sub-floor 60, then the tubing 15 is positioned along the grooved pathway 11 in the desired configuration. After the tubing 15 is appropriately positioned, then a finished wood flooring 80 can be installed directly over the panels 10 and supported tubing 15. If carpet or tile flooring constitutes the finished floor 80, then an additional ¼ inch luan should preferably be installed on the panels 10 to provide a sound continuous sub-floor.

Figure 10:
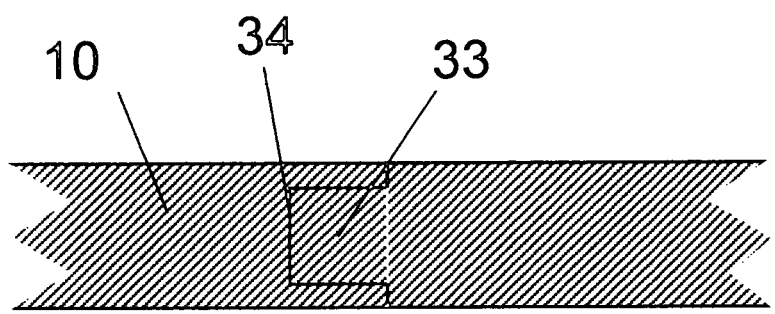
FIG. 10 schematically illustrates a sectional view similar to FIG. 5 and showing an alternative way of coupling adjacent panels to one another.

When designed to receive 0.50 inch O.D. PEX tubing 15, the overall height of the panel 10 (between the opposing surfaces 19 and 20) is about 0.625 inches with length of an edge approximately 24 inches. Additionally, the curved tongues 13 each protrude about 0.375 inch from each edge with a radius of curvature of approximately 3.94 inches, and with the grooves 12 each comprising a complementary recess of approximately the same dimension. Alternatively, the tongue-and-groove coupling could be rectangular as shown in FIG. 10, with the tongue 33 protruding, e.g., about 0.375 inch from the edge and having a normally-extending surface also about 0.375 inch in height; the groove 34 comprises a substantially rectangular complementary recess of similar dimensions to receive the tongue 33.

In the embodiment illustrated in FIG. 1, there is a distance of approximately 7.875 inches between center-lines of the three substantially parallel channels 21, 22, 23 forming the grooved pathway 11, with the two outer channels 21 and 23 positioned approximately 3.938 inches from the immediately-adjacent substantially parallel edge. Additionally, there is a distance of approximately 15.750 inches between curved ends of the partial oblong channels 28, 29 or 30, 31 along the common edge, with these channels 28-31 each opening upon this edge approximately 3.938 inch from a respective corner.

The embodiment is illustrated as forming a substantially square panel 10 when viewed from above or below, although other panel shapes are contemplated within the purview of the present invention, e.g., rectangular shapes. Furthermore, although the panel surface 19 has been illustrated with two entire and partial oblong channels forming the grooved pathway 11, the grooved pathway 11 may take a different configuration in accordance with the present invention, e.g., containing only one oblong portion entirely positioned upon the panel surface 19 and/or omit one or both of the partial oblong sections, and/or include one or more additional oblong portions entirely positioned upon the panel surface 19.

The panels 1 are easily installed underneath the flooring 80 as illustrated, with no alteration to existing or planned wood frame floor construction required. The panels are also self-supporting upon interlocking, with ease of arranging the tubing 15 thereon enhanced by the grooved pathway 11 configuration provided on each panel 10. Furthermore, the grooved pathway 11 themselves can take any of a variety of cross-sectional configurations, e.g., a multi-faceted configuration as shown by the tube-receiving track of U.S. Pat. No. 5,743,330 issued Apr. 28, 1998, the contents of which are incorporated by reference herein.

The preceding description of the present invention is merely exemplary and not intended to limit the scope thereof in any way.

What is claimed is:

1. A set of substantially identical square hydronic heating panels,
   (a) each panel having two sides, each side forming a plane, each panel having four edges forming a perimeter of each side, the edges herein designated an edge A, an edge B, an edge C, and an edge D, with the edge A and the edge C being opposite each other and the edge B and the edge D being opposite each other;
   (b) each panel being traversed by a plurality of grooves for receiving hydronic pipes on at least one of the two sides of the panel forming a grooved side, each of said grooves forming a linear gap in the plane of the grooved side, each of said linear gaps having a non-constant gap width in the plane of the grooved side,
   (c) the plurality of grooves of each panel having only three straight grooves parallel to one another, two of the straight grooves of each panel being outer grooves and one of the straight grooves of each panel being an inner groove, the plurality of grooves including curved grooves, each straight groove intersecting at least two of said curved grooves of the plurality of grooves and thereby forming intersecting groove portions where two or more of the grooves intersect and non-intersecting groove portions where the grooves does not intersect,
   (d) all the gap widths at the non-intersecting groove portions being the same,
   (e) each of said three straight grooves terminating at the edge A at 90° to the edge A and forming an exit, and each of said three straight grooves terminating at the edge C at 90° to the edge C and forming an exit, two of the exits of said three straight grooves at said edge A are at a distance B from each other, two of the exits of the three straight grooves at said edge C are at the distance B from each other, and each of the edge A and the edge C have no exits of any of the curved grooves;
   (f) at least two of said curved grooves terminating at the edge B at 90° to the edge B forming a first pair of exits at the distance B from one another and at least two of said curved grooves terminating at the edge D at 90° to the edge D forming a second pair of exits at the distance B from one another, the curved grooves terminating at said edge B intersecting a first straight groove of said three straight grooves at a tangent, the curved grooves terminating at said edge D intersecting a second straight groove of said three straight grooves at a tangent, each of the edge B and the edge D having no exits of any the straight grooves;
   (g) such that, when a first panel and a second panel of the set of substantially identical hydronic heating panels are assembled edge to edge to form a seam with one of the edge A or the edge C of the first panel adjoined to one of the edge B or the edge D of the second panel, each of the two exits of the curved grooves of the edge B or the edge D in the second panel is aligned with one of the exits of said three straight grooves in the edge A or the edge C in the first panel and two of the three straight grooves of the first panel that terminate at the seam are each aligned with one of the exits of the curved grooves at the seam.

2. The set of substantially identical square hydronic heating panels of claim 1 wherein each of at least four of the exits of the three straight grooves is at a distance K from a nearest corner of the respective panel.

3. The set of substantially identical square hydronic heating panels of claim 2 wherein each of the exits of at least two of the curved grooves is at a distance K from a corner of the respective panel.

4. The set of substantially identical square hydronic heating panels of claim 1 wherein the grooves were cut with a router.

5. The set of substantially identical square hydronic heating panels of claim 1 wherein the panels are made of pressed and glued wood plies.

6. The set of substantially identical square hydronic heating panels of claim 1 wherein the panels are made of pressed and glued cellulose fiber board.

* * * * *